United States Patent

Hauser et al.

[11] Patent Number: 5,935,628
[45] Date of Patent: *Aug. 10, 1999

[54] QUICK COOKING PASTA

[75] Inventors: Thomas Wilhelm Hauser, Ebolisa, Italy; Lorenzo Panattoni, Winterthur, Switzerland

[73] Assignee: Nestec S.A., Vevey, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/510,722

[22] Filed: Aug. 3, 1995

[30] Foreign Application Priority Data

Aug. 19, 1994 [EP] European Pat. Off. .............. 94112910

[51] Int. Cl.$^6$ ....................................................... A23L 1/16
[52] U.S. Cl. ........................... 426/143; 426/144; 426/557
[58] Field of Search .................... 426/143, 144, 426/451, 514, 499, 557, 516

[56] References Cited

U.S. PATENT DOCUMENTS

| | | | |
|---|---|---|---|
| 1,628,251 | 5/1927 | Laskey | 426/514 |
| 1,788,689 | 1/1931 | Penza | 426/143 |
| 1,959,006 | 5/1934 | Penza | 426/143 |
| 2,686,720 | 8/1954 | La Rosa | 426/144 |
| 3,577,935 | 5/1971 | Reinhart et al. | 425/315 |
| 4,540,592 | 9/1985 | Myer et al. | 426/516 |

FOREIGN PATENT DOCUMENTS

| | | | |
|---|---|---|---|
| 288136 | 10/1988 | European Pat. Off. | 426/557 |
| 0 450 428 | 3/1991 | European Pat. Off. . | |
| 0 557 139 | 1/1993 | European Pat. Off. . | |
| 61-239850 | 10/1986 | Japan | 426/451 |
| 5-3760 | 1/1993 | Japan | 426/557 |

OTHER PUBLICATIONS

Encyclopedia of Food, Ward, N.Y. 1923 p. 292.
Patent Abstracts of Japan, vol. 9, No. 112 (C–281) (1835) Mar. 16, 1985.

*Primary Examiner*—Steven Weinstein
*Attorney, Agent, or Firm*—Pennie & Edmonds LLP

[57] ABSTRACT

Long, thin and tubular quick cooking pasta having, in transverse section, a wall thickness of between 0.60 and 1.1 mm and teeth on the inner surface of the tube, which are longitudinal and parallel, having a height of between 0.3 and 1.6 mm and having a height to wall thickness ratio of between 0.4 and 2.

19 Claims, 5 Drawing Sheets

QUICK COOKING PASTA

TECHNICAL

The present invention relates to a long, thin and tubular pasta which can be cooked in a time on the order of 5 minutes and which, when cooked, has a cylindrical shape and a texture in the mouth which are equivalent to those of a traditional cooked pasta of the same type.

BACKGROUND ART

Various quick cooking pastas are already known. They generally have a thickness of between 0.3 and 0.6 mm, or alternatively have longitudinal and parallel grooves on their surface, which allow the cooking operation to be carried out in a shorter time than that required to carry out the same operation with groove-free products.

EP 0,450,428 thus describes a "spaghetti" which can be cooked in a minimum time of 2 minutes, composed of three lobes forming outer grooves, the lobes, of specific shape, being longitudinal, parallel and angularly equidistant at 120°.

Similarly, EP 0,557,139 describes long, thin and tubular pastas capable of being cooked in perforated sachets in a minimum time of 4 min, the cooked pastas not agglomerating because of the presence of striations on their outer surface. The thickness of the wall of these pastas is between 0.4 and 0.6 mm. Furthermore, these striations preferably have a height less than half the thickness of the wall, the said height generally being between 0.2 and 0.3 mm. Finally, these striations may also be between 0.5 and 0.85 mm wide, and have a gap separating two adjacent striations which is between 0.5 and 0.85 mm.

Unfortunately, the texture in the mouth of these cooked tubular pastas is soft, or even flaccid, and is not sufficiently reminiscent of the firm consistency of cooked tubular pastas of the same type, that is to say of striation-free pastas, which, before cooking, have a wall thickness of between 1.1 and 1.6 mm and, once cooked, are of the same appearance on a plate.

Furthermore, these pastas become oval-shaped during their cooking, which is not pleasing to consumers wishing to obtain a pasta of cylindrical appearance, as may be obtained by cooking tubular pastas of the same type, as described above.

The aim of the present invention is to overcome the drawbacks of the prior art.

SUMMARY OF THE INVENTION

The present invention relates to long, thin and tubular quick cooking pasta having, in transverse section, a wall thickness of between 0.6 and 1.1 mm and teeth on the inner surface of the tube, which are longitudinal and parallel with each other, having a height of between 0.3 and 2 mm and having a height to wall thickness ratio of between 0.35 and 2.

Preferably, the wall is less than 1.05 mm thick, and the inner teeth are between 0.3 and 0.9 mm wide and have a gap between two adjacent teeth of between 0.2 and 0.7 mm.

DETAILED DESCRIPTION OF THE INVENTION

In this description, the term "traditional pasta" is understood to mean a long, thin and tubular pasta, generally cooked in 10 to 15 minutes, which may be straight, curved or twisted into a spiral, and which has a wall thickness generally of between 1.1 and 1.6 mm, the outer surface of which is smooth, undulating or scalloped, for example. Among these pastas, it is thus possible to include the various types of traditional tubular pasta, such as (the names are given in Italian) penne, pennette, pennettine, maccheroni, maccheroncelli, mazzani, zite, candele, garganelli, campagnole, cannelli zitoni, cannelli ziti, tagliati di mezzani, canelloni, maniche, bombardoni, rigatoni, cannaroni, rigatti, mezze maniche, ditaloni, ditali di zitone, ditali, avemarie, coralli, cannolichi, denti d'elefante, gigatoni, crestine, gobbetti, chifferi, cimieri and lumache, for example ("Die gute Form" [The Right Shape], M. Götz et al., Museum of Design, Basle, 1991).

The advantages of the products according to the present invention, noted during tests which were carried out, are as follows:

cooking time of about 5 minutes according to the traditional method (boiling water), that is to say reduced by more than 50% compared with the time required to cook a traditional pasta having the same diameter;

texture in the mouth having a firm consistency, highly reminiscent of that of traditional pastas having the same diameter;

cylindrical shape for the cooked product;

capacity to adsorb condiments which is greater than that of traditional pastas on account of the presence of the said longitudinal teeth;

appearance of the cooked product on the plate similar to that of traditional pastas of the same type. Indeed, during cooking, the teeth on the inner surface of the tube close up, leaving only very fine longitudinal outer lines, which are virtually invisible since they are inside the tube.

The pastas according to the present invention thus possess teeth on the inner surface of the tube which are between 0.3 and 2 mm in height and which also have a height to wall thickness ratio of between 0.35 and 2, preferably 0.4–2. It has, indeed, been possible to show that inner teeth which are too small do not allow a sufficiently acceptable texture in the mouth or a cylindrical appearance of the cooked pasta to be obtained. Furthermore, teeth which are too large tend to be too visible before or after cooking, and also have a tendency to promote development of the oval shape of the cylinder, once cooked.

On the other hand, the longitudinal orientation of the teeth is not an important criterion for obtaining a pasta having the advantages described above. Indeed, the teeth may be parallel to the longitudinal axis of the pasta or alternatively may twist around this axis forming spirals, for example. A spiral of teeth is preferred since, when these teeth close up during cooking, they leave internal channels which, on account of their spring-shaped configuration, force the pasta to remain cylindrical.

Furthermore, the pasta according to the invention may have, on its outer surface, undulations which are more or less pronounced. However, the wall thickness of the pasta is preferably not less than about 0.6 mm, the thickness being calculated from the internal surface of the pasta tube, disregarding the teeth, up to the highest outer surface of the tube.

Similarly, the pasta according to the invention may additionally have, on its outer surface, at least one longitudinal propeller blade, as is the case for the pastas of the "lumache" type mentioned above. In this case also, the wall thickness of the tube is preferably not less than about 0.6 mm, the thickness being calculated from the internal surface of the pasta tube, disregarding the teeth, up to the highest outer surface of the tube, disregarding the propeller blades.

In order to obtain a pasta according to the invention having the advantages described above, a pasta may be manufactured having inner teeth, the base of which, that is to say the lower part of a tooth having a height of 0.2 to 0.8 mm from the inner surface of the tube has a parallelepipedal or frustoconical contour with substantially flat or even convex and/or concave walls. The width of the base of the teeth is preferably between 0.3 and 0.9 mm.

On the other hand, the top portion of the teeth, that is to say the part above the base of each tooth, may be of any imaginable shape, that is to say that it may be square, rectangular, triangular, convex, or in the shape of a nail head. The width of the top portion of each tooth is preferably between 0.3 and 0.9 mm, and shapes which lead to optimum closing of the space between the teeth after cooking are chosen. In particular, a top portion in the shape of a nail head is chosen, this having the advantage of further increasing the surface area of the pasta which is accessible to water.

Finally, the inner surface of the cylinder separating two adjacent teeth may be substantially flat or alternatively may have a radius of curvature substantially equal to that of a traditional pasta of the same diameter the diameter being calculated from the inner surface of the tube. However, it is also possible to accentuate the curvature of this surface and thus to make it concave or even triangular, with a depth of between 0.2 and 0.4 mm, for example, care being taken, however, not to have a wall thickness between two adjacent teeth which is less than 0.6 mm, for example.

In order to obtain a pasta according to the invention having the advantages described above, and in particular a very firm texture in the mouth, it is also possible to manufacture pastas as described above having teeth which, taking every other one, are at least 1.5 times higher than the height of the other teeth.

The volume of the pasta is thus increased proportionally with its surface area and hence also the thickness of the cooked pasta, without, however, increasing its cooking time or neglecting optimum closing of the teeth after cooking. This pasta may thus cook in a time of the order of 5 minutes, the cooked product remaining substantially cylindrical, and the texture of the latter in the mouth is also improved in comparison with the other cooked products of the invention which are described above.

In order to obtain a pasta according to the invention having the advantages described above, and in particular having cylinder rigidity once cooked, it is possible to manufacture pastas according to the invention having the characteristics described above and additionally having, in their tubular part, a central spindle connected to the inner wall by at least three spokes which are longitudinal with respect to the spindle.

The thickness of the walls of the spokes may be between 0.6 and 1.1 mm, the spindle may have a diameter of between 0.6 and 1.1 mm, and the spokes may be parallel to the spindle of the pasta or alternatively may rotate relative to this spindle. Parallel and equiangular spokes are preferably produced, which thus reinforce the rigidity of the cooked product.

In addition, these spokes afford another advantage for tubular pastas greater than 10 mm in diameter. Indeed, whether they are traditional slow cooking or according to the invention, the pastas greater than 10 mm, especially greater than 15 mm, in diameter tend to flatten out on the plate under their own weight, and may thus again give an impression of developing an oval shape. On the other hand, when they have the spokes described above, the pastas according to the invention appear perfectly round on the plate, regardless of their diameter.

The diameter of the pastas according to the invention is thus preferably between 6 and 30 mm the diameter being calculated from the outer surface of the pastas.

Finally, the pastas according to the present invention may be manufactured by production means already known to those skilled in the art, and may then be marketed within the ranges of long, thin and tubular pastas having a smooth or undulating outer wall, which pastas may or may not be filled, and especially the products already described above.

In particular, in order to manufacture the pastas according to the present invention, wheat flour, especially from the species *Triticum durum* or *Triticum aestivum,* is mixed with water up to a water content of 25–35%, in a standard mixer, for example. The mixture may then be kneaded for 10 to 15 minutes at a temperature of 30 to 35° C. Preferably, in the last 5 to 8 minutes of the kneading, the absolute air pressure in the mixer is reduced by vacuum suction to 30 to 130 millibar, so as to remove air bubbles from the mixture.

The cereal dough may then be introduced into a single-screw extruder, for example, and the dough may be extruded at a pressure of 85 to 150 bar, while cooling the body of the extruder with water so that the temperature of the dough does not exceed 45 to 55° C., for example. A knife placed at the outlet of the die can then cut the extruded pasta into pieces of pasta between 0.5 cm and 20 cm in length, for example.

The pastas according to the invention obtain their shape by means of die inserts which have an orifice of similar configuration to that of the pastas according to the invention, in particular a configuration which is slightly larger on account of the shrinkage of the pastas when they are dried as described below, for example.

Indeed, the pieces of pasta may then be dried in a conventional manner until they have a water content of between 3 and 13%, but preferably 5 to 12%, for example. It is then preferred to cool the dried pastas, having a temperature of the order of 60 to 82° C. on leaving the drying device, to an ambient temperature on the order of 25° C., and then to package them in plastic bags.

BRIEF DESCRIPTION OF THE DRAWINGS

The present invention is illustrated below by the description of three embodiments, with reference to the attached drawings.

EXAMPLES

Example 1

Figure 1:
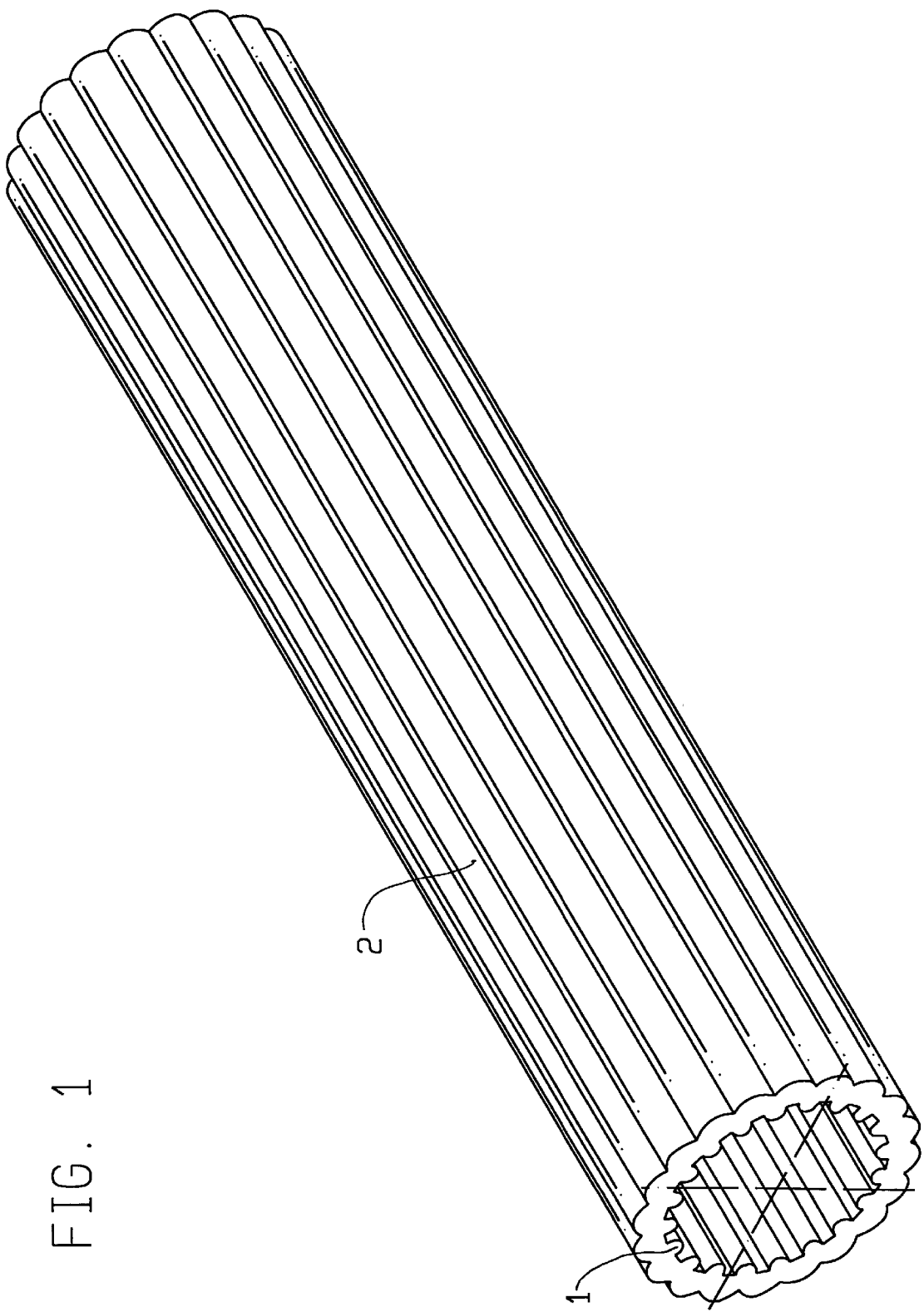
FIG. 1 is a view in perspective, on an enlarged scale, of a pasta according to the invention.
Figure 2:
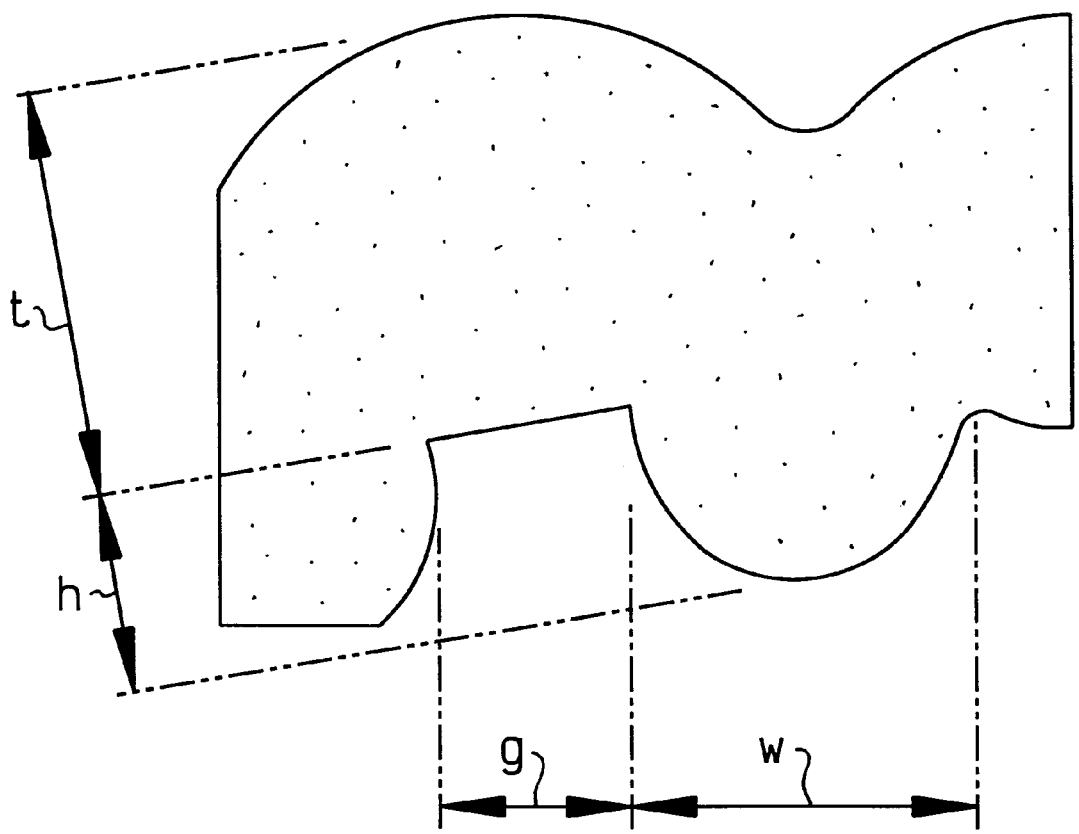
FIG. 2 is a partial view, enlarged 52 times in an optical microscope, of a transverse section of the pasta of FIG. 1.

The same pastas as that illustrated in FIGS. 1 and 2 are prepared by production means known to those skilled in the art.

As may be seen in FIG. 1, these pastas comprise inner teeth "1" extending longitudinally and parallel to their axis, and outer undulations "2" characteristic of penne-type pastas, in particular of "penne rigate".

Furthermore, as described in FIG. 2, the average wall thickness "t" is 1.05 mm, each tooth has an average height "h" of 0.45 mm, an average width "w" of 0.70 mm and an average gap "g" between two adjacent teeth of 0.49 mm. Finally, the diameter of these pastas is about 8.9 mm and they are about 50 mm in length.

For comparison, traditional slow cooking pastas having no inner teeth are prepared, and having the same outer undulations, a wall thickness of 1.3 mm, a diameter of 8.9 mm and a length of 50 mm. Such a pasta cooks under the conditions described below in 10 minutes.

For comparison, a quick cooking pasta is also prepared having no inner teeth or even outer undulations, and having a wall thickness of 0.5 mm, a diameter of 8.9 mm and a length of 50 mm.

These three types of pasta are cooked in fully boiling water with addition of 10 g/l of salt, until an inner white ring of ungelatinized starch is still seen in the wall, with the naked eye.

The firmness of the above cooked pastas is then determined, at a temperature of 65° C., using a Stevens texture analyser (LFRA model) fitted with a TA7 cutting device (Rheovisco A. G., Switzerland) which is driven at a rate of 0.2 mm/s, and using an Instron (model 1011) equipped with a Kramer cell which is driven at a cut/shear rate of 500 mm/min. The results, expressed in newtons, are illustrated in the table below.

| Pastas | Stevens machine (N) | Instron machine (N) |
|---|---|---|
| According to the invention | 3.73 | 815 |
| Slow cooking traditional | 4.08 | 982 |
| Quick cooking traditional | 1.86 | 433 |

As may be seen in the above table, the pastas according to the invention have a firmness which is markedly similar to slow cooking traditional pastas.

The cooking times of the pastas of the invention and of the quick cooking traditional pastas, as well as the assessment of their texture in the mouth and of their cylindrical appearance by a group of individuals, are illustrated in the table of Example 4 below.

Example 2

Figure 3:
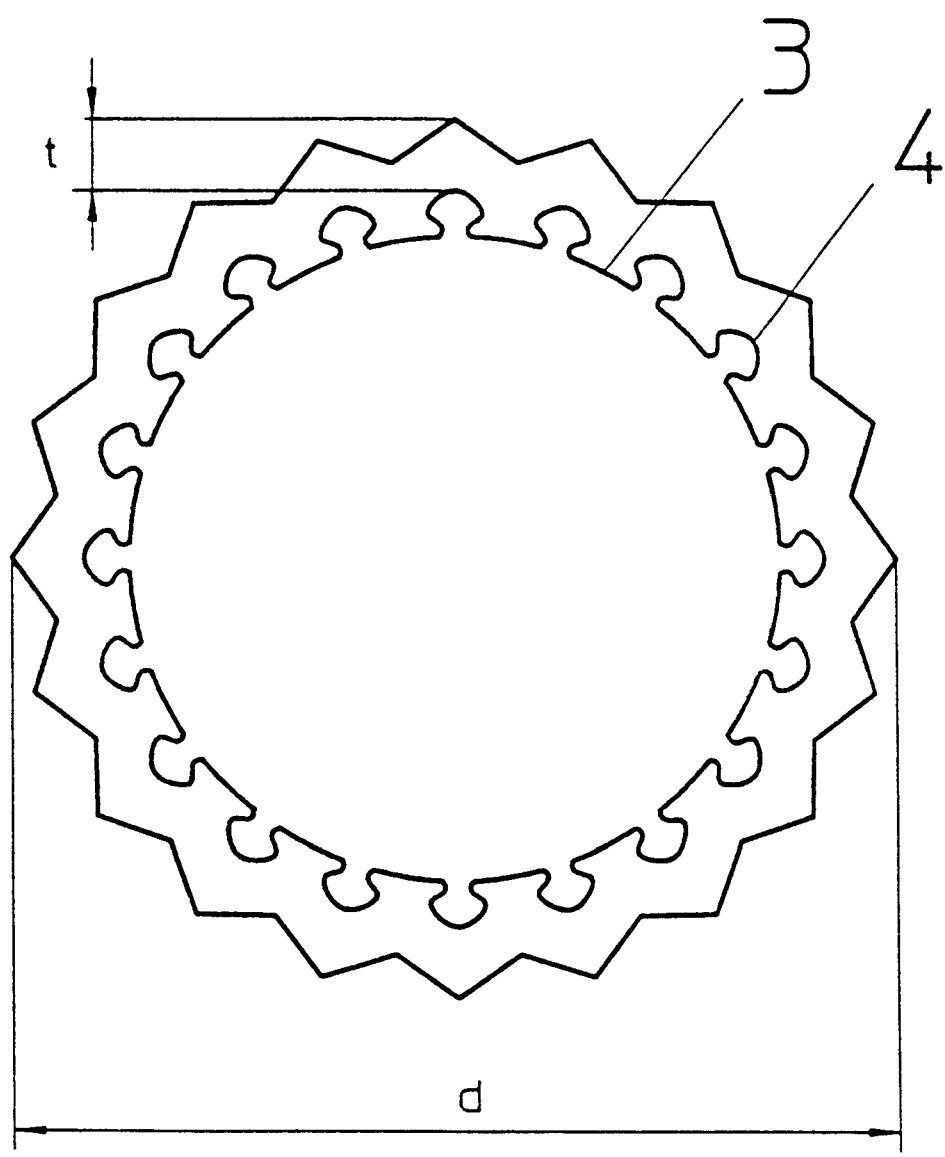
FIG. 3 is a view in transverse section, on an enlarged scale, of another pasta according to the invention, which has in particular a top portion in the shape of a nail head.

The same pastas as those illustrated in FIG. 3 are prepared by production means known to those skilled in the art. These pastas have a thickness "t" of about 0.7 mm, and inner teeth longitudinal and parallel to the axis, having a top portion "3" in the shape of a nail head, and a surface "4" separating two adjacent teeth which is concave. The diameter "d" of these pastas is about 8.7 mm and their length is about 50 mm.

For comparison, slow cooking traditional pastas without inner teeth are prepared, having the same outer undulations, a wall thickness of 1.3 mm, a diameter of 8.7 mm and a length of 50 mm.

The two types of pasta as described in Example 1 are cooked. The slow cooking traditional pastas cook in 10 min. The cooking time of the pastas of the invention, as well as the assessment of their texture in the mouth and of their cylindrical appearance by a group of individuals, are illustrated in the table of Example 4 below.

Example 3

Figure 4:
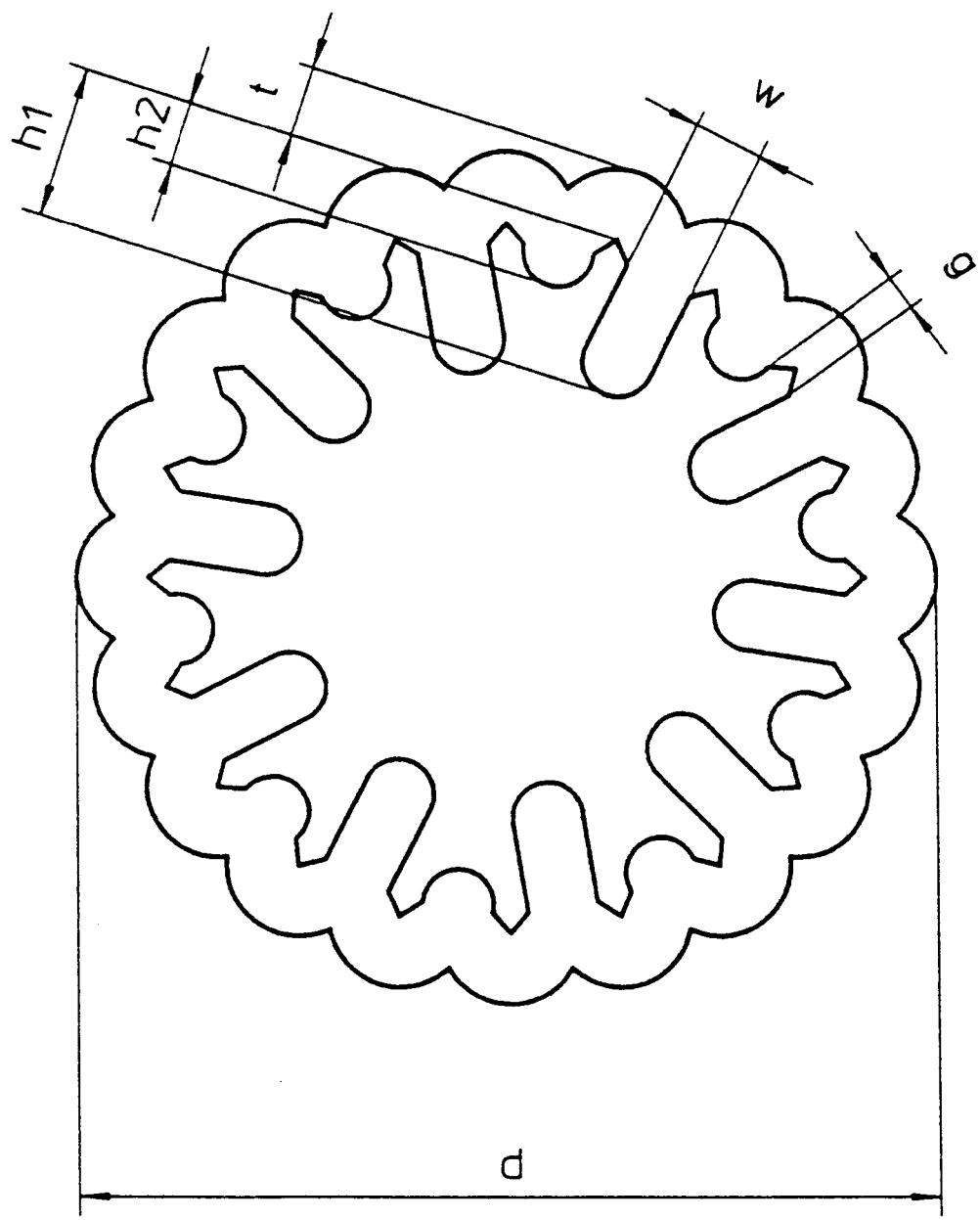
FIG. 4 is a view in transverse section, on an enlarged scale, of another pasta according to the invention, which has teeth of different size.

The same pastas as those illustrated in FIG. 4 are prepared by production means known to those skilled in the art. As may be seen, these pastas comprise teeth longitudinal and parallel to the axis of the pasta which, taking every other one, have a height "h1" of about 1.55 mm, whereas the other teeth have a height "h2" of about 0.65 mm. The width "w" of the teeth is about 0.72 mm, the gap "g" between two adjacent teeth is about 0.36 mm, the wall thickness "t" is about 0.72 mm, its diameter "d" is about 8.7 mm and the total length of the pasta is about 50 mm.

For comparison, traditional pastas without teeth are prepared, having the same outer undulations, a wall thickness of 1.3 mm, a diameter of 8.7 mm and a length of 50 mm.

The two types of pasta are cooked as described in Example 1. The slow cooking traditional pastas cook in 10 min. The cooking time of the pastas of the invention, as well as the assessment of their texture in the mouth and of their cylindrical appearance by a group of individuals, are illustrated in the table of Example 4 below.

Example 4

Figure 5:
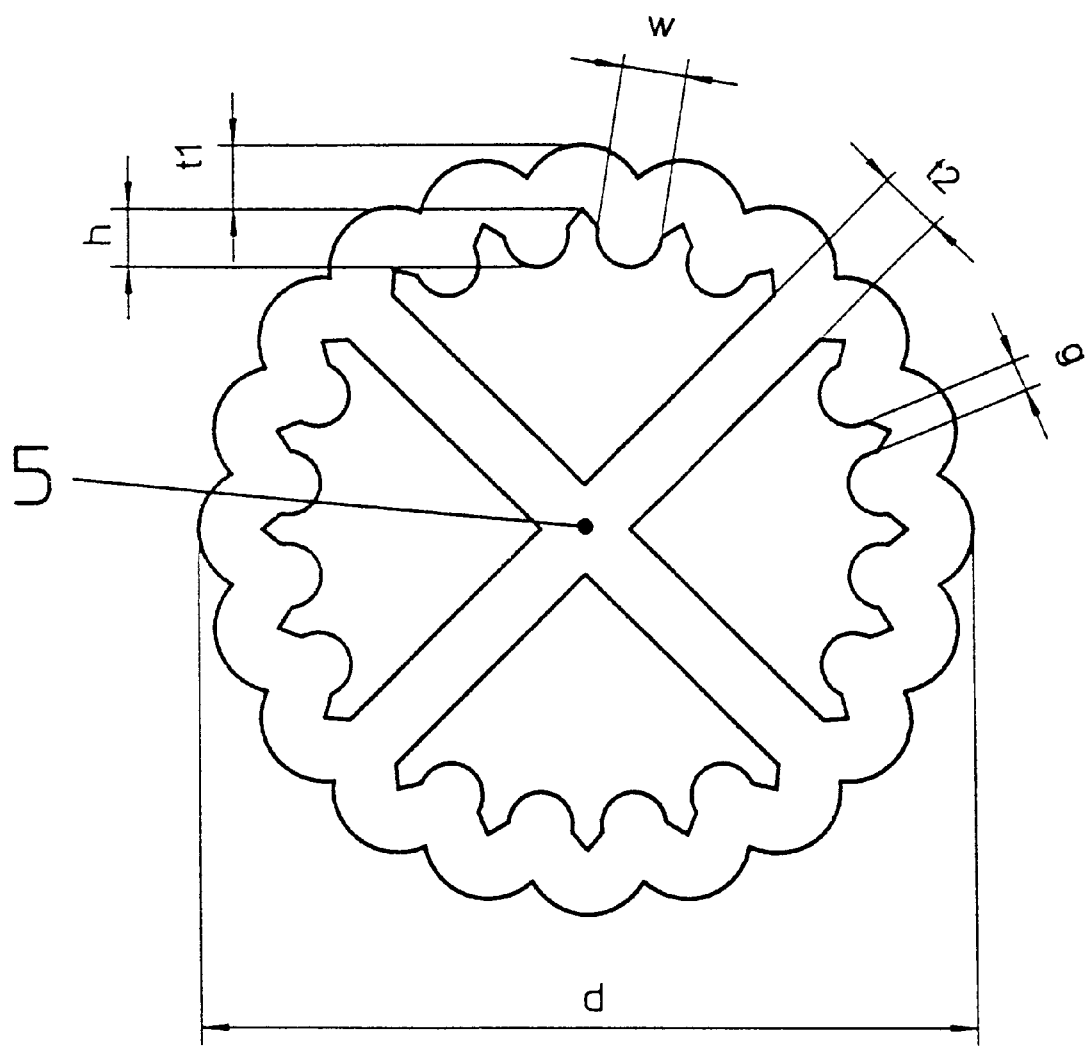
FIG. 5 is a view in transverse section, on an enlarged scale, of another pasta according to the invention which has, in its tubular part, reinforcing spokes.

The same pastas as those illustrated in FIG. 5 are prepared by production means known to those skilled in the art. The wall thickness "t1" is about 0.72 mm, each tooth longitudinal and parallel to the axis of the pasta has a height "h" of about 0.66 mm, a width "w" of about 0.72 mm and a gap "g" between two adjacent teeth of about 0.35 mm. These pastas also have a spindle "5" bearing 4 spokes which are substantially flat, longitudinal with respect to the axis of the pasta and equiangular at 90° C., with a wall thickness "t2" of about 0.72 mm. Finally, the diameter "d" of the pasta is about 8.7 mm and its total length is about 50 mm.

For comparison, traditional pastas without teeth or inner spokes are prepared, having the same outer undulations, a wall thickness of 1.3 mm, a diameter of 8.7 mm and a length of 50 mm.

The two types of pasta are cooked as described in Example 1, and the quality of the texture in the mouth, of the firmness and of the cylindrical appearance of these pastas are then tested by the means described below.

The texture in the mouth and the cylindrical shape of the pasta of the invention were assessed by a tasting and visual test involving about thirty individuals. The values are given as a percentage of individuals who found the pastas according to the invention to be similar to those of the corresponding comparative example (slow cooking traditional pasta).

Similarly, the same test of comparison is carried out between the two cooked pastas, the quick cooking pasta and the slow cooking pasta, which are described in the comparative examples of the pasta of Example 1. The values are given as a percentage of individuals who found the traditional quick cooking pastas to be similar to the slow cooking traditional pastas.

The results of the various tests carried out on the pastas of Examples 1 to 4, as well as their cooking time, are illustrated in the table below.

| Pasta according to the invention | Texture in the mouth (%) | Cylindrical shape (%) | Cooking time (min) |
| --- | --- | --- | --- |
| Example 1 | 65 | 86 | 5 |
| Example 2 | 63 | 87 | 5 |
| Example 3 | 75 | 75 | 5 |
| Example 4 | 20 | 90 | 5 |
| Quick cooking traditional pasta of Example 1 | 8 | 11 | 4 |

What is claimed is:

1. Long, thin and tubular quick cooking pasta having an inner surface and defining, in transverse section, a wall thickness of between 0.6 and 1.1 mm, and comprising a plurality of parallel, longitudinal, spaced teeth extending from the inner surface, each tooth having a height of between 0.3 and 1.6 mm with the spacing between adjacent teeth is between about 0.2 and 0.7 mm, and having a tooth height to pasta wall thickness ratio of between 0.35 and 2; wherein the wall thickness of the pasta does not include the height of the teeth, with the teeth and the spaces between adjacent teeth being configured and dimensioned such that the spaces between the teeth close after cooking to provide virtually invisible longitudinal lines on the inner surface of the cooked pasta.

2. Pasta according to claim 1, characterized in that the inner teeth are between 0.3 and 0.9 mm wide and have a gap between two adjacent teeth of between 0.3 and 0.7 mm.

3. Pasta according to claim 2, characterized in that the wall surface separating two adjacent teeth is concave.

4. Pasta according to claim 1, characterized in that the top portion of the teeth is substantially flat, convex or in the shape of a nail head.

5. Pasta according to claim 1, characterized in that the teeth, taking every other one, are at least 1.5 times higher than the height of the other teeth.

6. Pasta according to claim 1, characterized in that it has, in its tubular part, a central spindle connected to the inner wall by at least three spokes.

7. The pasta of claim 1 wherein the teeth have a height of between 0.3 and 0.9 mm.

8. A pasta comprising an elongated tubular portion having an inner surface, a wall thickness of between 0.6 and 1.1 mm, and a plurality of spaced, longitudinally extending teeth on the inner surface of the tubular portion, the teeth having a height of between 0.3 and 0.9 mm with the spacing between adjacent teeth is between about 0.2 and 0.7 mm, and a tooth height to pasta wall thickness ratio of between 0.35 and 2; wherein the wall thickness of the pasta does not include the height of the teeth, with the teeth and the spaces between adjacent teeth being configured and dimensioned such that the spaces between the teeth close after cooking to provide virtually invisible longitudinal lines on the inner surface of the cooked pasta.

9. The pasta of claim 8 wherein the teeth are oriented parallel to the longitudinal axis of the tubular portion.

10. The pasta of claim 8 wherein the teeth extend along a spiral path about the longitudinal axis of the tubular portion.

11. The pasta of claim 8 wherein the teeth have flattened top portions in the shape of nail heads.

12. The pasta of claim 9 wherein adjacent teeth are separated by a concave wall portion.

13. The pasta of claim 8 wherein some teeth have a greater height than the others.

14. The pasta of claim 13 wherein the height of adjacent teeth are different.

15. The pasta of claim 14 wherein the height of some teeth are at least 1.5 times higher than that of adjacent teeth.

16. The pasta of claim 8 wherein the outer surface of the tubular portion is irregular.

17. The pasta of claim 8 wherein adjacent teeth are separated by an inverted V-shaped wall portion.

18. The pasta of claim 8 further comprising a central spindle having at least three spokes which are connected to the inner surface of the tubular portion.

19. The pasta of claim 8 wherein the teeth have a height to wall thickness ratio of between 0.4 and 2.

* * * * *